R. W. DE WITT.
DIFFERENTIAL GEARING.
APPLICATION FILED JULY 23, 1913.
1,145,295.
Patented July 6, 1915.
2 SHEETS—SHEET 1.
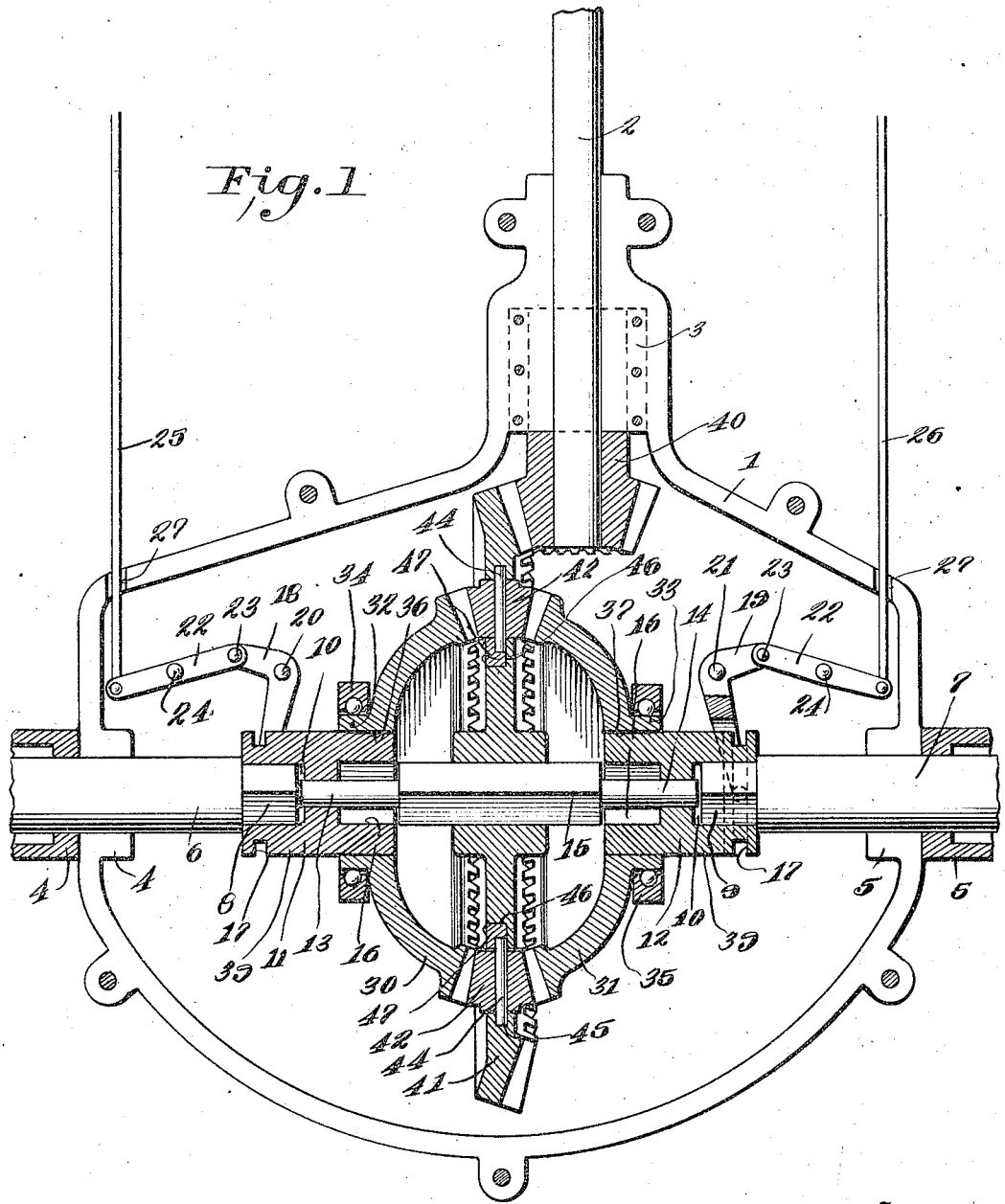

R. W. DE WITT.
DIFFERENTIAL GEARING.
APPLICATION FILED JULY 23, 1913.
1,145,295.
Patented July 6, 1915.
2 SHEETS—SHEET 2.
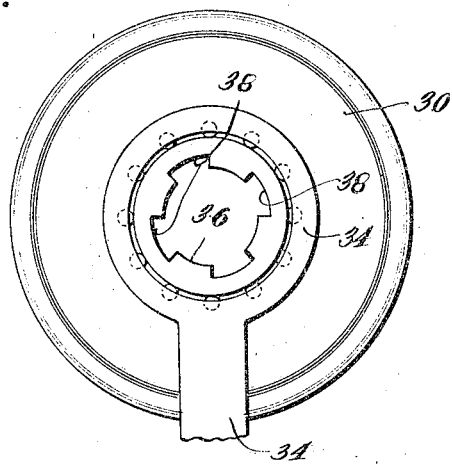
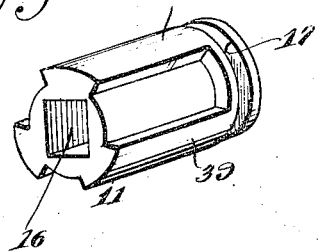
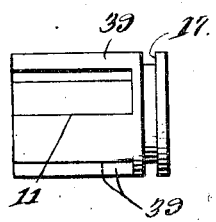
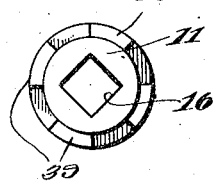

UNITED STATES PATENT OFFICE.

ROBERT W. DE WITT, OF DENVER, COLORADO.

DIFFERENTIAL GEARING.

1,145,295.  Specification of Letters Patent. Patented July 6, 1915.

Application filed July 23, 1913. Serial No. 780,754.

*To all whom it may concern:*

Be it known that I, ROBERT W. DE WITT, a citizen of the United States, residing at Denver, in the county of Denver and State of Colorado, have invented certain new and useful Improvements in Differential Gearing, of which the following is a specification.

This invention relates to differential gearing for use with motor vehicles and has for its object the provision of a set of differential gearing which are so constructed that when some portion thereof, for example, one of the compensating gears of the differential, breaks, the vehicle may be propelled to a repair shop without in any manner injuring the unbroken parts of the differential gearing.

Another object of this invention is the provision of a set of gears as above mentioned by means of which either of the drive wheels of the vehicle may be operated independently of the other, thereby affording means for propelling the vehicle should some part of the mechanism coöperating with one of the drive wheels become broken or otherwise rendered incapable of performing its functions.

A further object of this invention is the provision of means for controlling the operation of a set of differential gears as set forth from the seat of the vehicle and determining the damage which has been sustained by the rear portion of the driving mechanism of the vehicle without leaving the seat of the same or soiling one's hands.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawings wherein like characters of reference designate like or corresponding parts throughout the several views, and in which,—

Figure 1 is a view, partially in section, of the improved differential gearing; Fig. 2 is a side elevation of one of the compensating or master gears, showing the bearing in which the same is mounted; Fig. 3 is a detail perspective view of a sliding sleeve which controls the operation of the gears; Fig. 4 is a side elevation of the sliding sleeves shown in Fig. 4; and, Fig. 5 is an end view of the same.

Referring more particularly to the drawings, the numeral 1 designates a casing which has the main driving shaft 2 of a motor vehicle (not shown) mounted in a bearing 3 which is formed thereupon. The bearing 3 may be either a roller or ball bearing or any other suitable type of anti-friction bearing. The casing 1 also has bearings 4 and 5 formed upon its sides which have the two sections 6 and 7 of the rear or driving axle of the vehicle mounted therein respectively. The inner ends 8 and 9 of the sections 6 and 7 of the rear driving axle of the vehicle are square in cross-section and are seated in recesses 10 which are formed in the outer ends of sleeves 11 and 12.

The sleeves 11 and 12 each have an annular groove 17 formed therein near the extreme outer end thereof which receives the square ends 8 and 9. Bell cranks 18 and 19 are connected to the sleeves 11 and 12 through the medium of trunnions received in the grooves 17. The bell arms 18 and 19 are pivotally mounted upon one side of the casing 1 as at 20 and 21 and have links 22 pivotally connected to the short arm thereof as at 23. The links 22 are in turn pivotally mounted upon pins 24 which are also carried by one side of the casing 1 and have rods 25 and 26 connected to their outer ends. The rods 25 and 26 extend out through the casing 1, through the opening 27 formed therein and are connected to foot levers (not shown) which are placed in the vehicle in a position to be conveniently operated from the seat of the same.

Compensating or master gears 30 and 31 which are shaped in the form of an arc of a circle in cross-section as is clearly shown in Fig. 1 of the drawings have their hubs or shanks 32 and 33 revolubly mounted in anti-friction bearings 34 and 35. The bearings 34 and 35 are carried by the casing 1. The hubs or shanks 32 and 33 of the compensating gears 30 and 31 are provided with cut-out portions 36 and 37 extending therethrough which cut-out portions have other cut out portions 38 communicating therewith as is shown in Fig. 3 of the drawings. The cut out portions 38 are formed by cutting segments of a circle of larger diameter than that of the cut out portions 36 out of the hubs or shanks 32 and 33 of the gears. The sleeves 11 and 12 are slidably mounted in the shank of gears 30 and 31 and turn with them at all times and have in their ends recesses 16 which are square in cross-section so as to efficiently receive the ends of the square shaft 15. The sliding sleeves 11 and 12 have projections 39 formed integral therewith and extending from near the groove 17 to the extreme inner end of said sleeves. The projections 39 are the same shape as the cut out portions 38 and are seated therein at all times.

Mounted upon the square shaft 15 and meshing with a pinion 40 is a bevel gear 41 which is the main driving gear of the vehicle. The pinion 40 is mounted upon the inner end of the power shaft 2 of the vehicle (not shown) and by meshing with the bevel gear 41 will transmit motion from the engine (not shown) to the sections 6 and 7 of the rear driving axle of the vehicle through the medium of gears 41 and 42 and 30 and 31 and sleeves 11 and 12. The master or compensating gears 30 and 31 mesh with pinions 42 which are mounted in cut-out portions 43 formed in the face of the bevel gear 41. The pinions 42 are mounted upon pins 45 formed in the bevel gear 41. The inner ends of the pins 44 are seated in an enlarged cut out portion 46 which has a block 47 removably mounted therein whereby the pins 44 and the gears 42 may be removed out of the recesses 43 should it be desired to do so. By operating either of the sleeves 11 or 12 and moving the same inwardly so that the recess 16 will engage with the square on the end of shaft 15 the axle shafts may be released according to whichever of the sleeves is moved by means of rods 25 or 26. In this manner either of the drive wheels of the vehicle may be thrown out of operation or caused to operate independently of the other one; in examples such as when one of the sections 6 or 7 of the driving axle of the vehicle breaks the wheel upon the good section of the rear axle may be operated so as to receive all of the power from the engine and operate the vehicle independently of the other wheel, thereby allowing the vehicle to be moved to a suitable place for repairing the same, also in instances when one wheel of the vehicle is fast in mire or heavy mud the entire power can be concentrated upon the other wheel and in this manner the drawing of the wheel out of the mud or mire is greatly facilitated.

In practical fields, certain minor features of construction, combination and arrangement of parts may necessitate alterations to which the patentee is entitled, provided such alterations are comprehended with the scope of what is claimed.

What is claimed is:

1. In a differential transmission gearing for vehicles, a power shaft, a two-part vehicle axle, a bevel pinion mounted upon one end of said power shaft, sliding sleeves mounted on the proximate ends of said vehicle axle to turn therewith, a squared axle mounted between said sleeves to be capable of revoluble movement coaxially with said end of the vehicle axle independently of turning of the sleeves when in their normal position, a bevel gear carried by said squared axle to mesh with said bevel pinion and provided with a plurality of cut-out openings therethrough, a plurality of bevel transmission pinions revolubly mounted within said cut-out portions, master gears mounted on said sleeves to have mesh with said bevel transmission pinions and to hold said bevel gear in the proper relation of rotation, bell-crank shifting levers connected with said sleeves and independently mounted to be operated to move either of said sleeves to a position to be locked to revolve positively with one of said bevel gears in a relation that either of the axle members and the wheels carried thereby may be positively operated independently of the remaining drive wheels, and an operating rod for each of said bell-crank levers.

2. The combination with a sectional driving axle of a motor vehicle, sliding sleeves mounted upon the inner ends of the sections of said driving axle, a casing, master gears carried by bearings formed upon said casing, sleeves slidably received through openings provided in said master gears, projections formed upon said sliding sleeves to engage with similarly arranged projections upon the master-gears and to hold the sleeves splined thereto, means for operating said sliding sleeves to have movement in an endwise direction through the mounting in the master-gears and to yet retain their connection to turn with the members of the axle, a main driving gear mounted between said master-gears to revolve coaxially with the axle members, and means carried by said main driving gear to be engaged with said sleeves on inward sliding movement thereof to lock the members of the shaft to be positively rotated therewith.

3. The combination with a sectional driving axle of a motor vehicle, sliding sleeves mounted upon the inner ends of the sections of said driving axle, a casing, master gears carried by bearings formed upon said casing and received around said sliding sleeves, projections formed upon said sliding sleeves to engage with similar projections formed upon the master-gears to hold said members slidably splined together, means for operating said sliding sleeves to cause greater extension thereof from the axle members, a main driving gear, means carried by said main driving gear for engagement by said sleeves in their extended position, said master gears and driving gear so arranged that the sections of the driving shaft of the vehicle may be positively operated by said main driving gears either in unison with or independently of each other, and means connected to said sliding sleeves and extending to the front portion of the vehicle in close proximity to the side thereof for operating said sleeves.

4. The combination with a sectional driving axle of a motor vehicle, sliding sleeves mounted upon the inner ends of the sections of said driving axle, a casing, master gears carried by bearings formed upon said casing and positioned to embrace the sliding sleeves, projections formed upon said sliding sleeves to engage with similar projections formed upon the master-gears and to thus be loosely splined thereto, means for operating said sliding sleeves to cause a greater extension thereof from the end of said axle section, a main driving gear mounted between said master-gears and having cut-out portions provided through the body thereof adjacent the teeth of said master-gears, bevel pinions mounted in said cut-out portions to mesh with each of said master-gears, and a shaft portion carried by said main driving gear to be engaged by said sliding sleeves upon inward movement thereof to positively lock the axle sections to be rotated therewith.

5. The combination with a vehicle driving axle composed of two members, a casing, master-gears received within the casing and journaled in bearings formed thereon, sliding sleeves mounted upon the inner ends of said axle members to be embraced within the hub portion of said master-gears, projections provided upon said sliding sleeve to engage with similar projections carried by the master-gears to hold said sleeve loosely splined thereto, a main driving gear mounted between said master-gears to have the axis of rotation thereof coaxially arranged with respect to said master-gears and provided with a plurality of cut-out portions formed through the body thereof, bevel pinions mounted in said cut-out portions to mesh at opposite sides with each of said master-gears and hold the driving gear in a revolubly suspended mounting, means to transmit motion to said main driving gear, independent means to move said sleeves in their sliding relation to points proximate the main driving gear, and a squared shaft secured to turn with said main driving gear and to be engaged by said sliding sleeves when moved to their proximate position to lock said sleeves and the axle portion connected therewith to be positively revolved by movement of said driving gear.

6. The combination with a sectional driving axle of a vehicle, sliding sleeves mounted upon the inner ends of said axle sections to be at all times revolved therewith and provided with squared sockets, a casing, master-gears received around said sleeves and rotatably mounted in bearings provided in the casing, projections formed on said sleeves to engage with similar projections carried by said gears to spline the sleeves loosely thereto, a main driving gear received between said master-gears and having a plurality of openings formed through the body portions thereof, bevel pinions rotatably mounted in said cut-out portions to be engaged at opposite points by each of said master-gears and to hold the main driving gear suspended and revolubly mounted in a full floating relation, means connected with said sliding sleeves to be actuated by the operator to cause movement thereof in an extended relation into proximity to said main driving gear, means to transmit motion from the power unit to said driving gear, and a squared shaft carried by said driving gear to be engaged in the squared socket of said sleeves as the sleeves are moved to their extended position and to lock that section of the shaft connected with the engaging sleeves to be positively rotated with the drive gear.

In testimony whereof I affix my signature in presence of two witnesses.

ROBERT W. DE WITT.

Witnesses:
  ZACHARY T. BROWN,
  PAUL BRINKHAUS.